July 17, 1951     L. EASTLUND     2,560,936
GRIPPING OR LIFTING MEANS
Filed Jan. 12, 1949
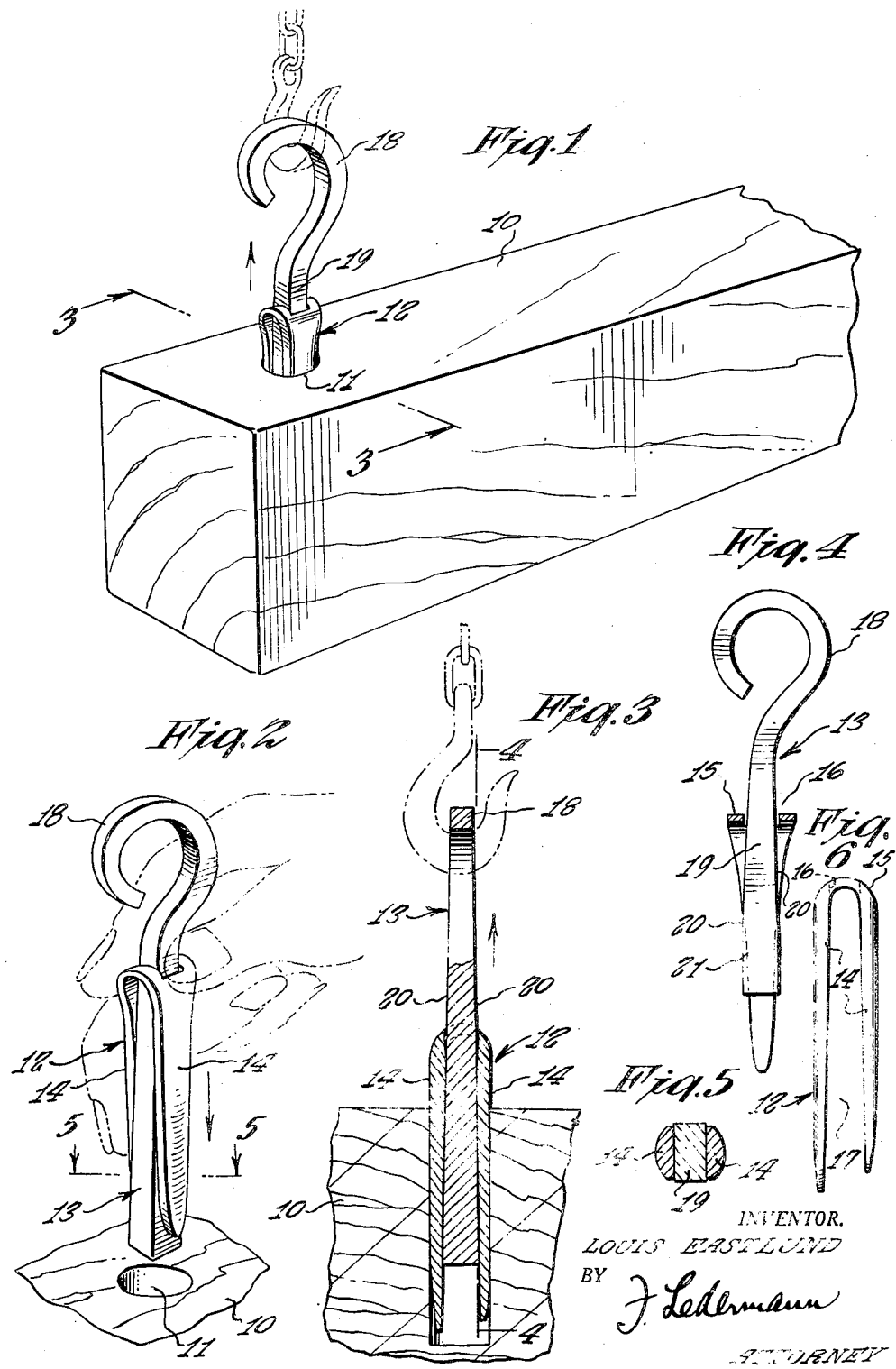
INVENTOR.
LOUIS EASTLUND
BY
ATTORNEY Patented July 17, 1951

2,560,936

UNITED STATES PATENT OFFICE 2,560,936

GRIPPING OR LIFTING MEANS

Louis Eastlund, Brooklyn, N. Y.

Application January 12, 1949, Serial No. 70,539

1 Claim. (Cl. 294—89)

This invention relates to gripping or lifting means, and aims broadly to provide a two-piece implement the parts of which are slidable with respect to each other, one of which is adapted to be inserted into a hole or the like in the member to be gripped or lifted, the other of which upon application thereto of a pulling or lifting force locks the first part or member of the implement in the member to be lifted, means being further provided to limit the slidable movement of the second part so that it cannot be extracted from the first part. Thus, heavy or large objects, such as, by way of example, beams, stones such as used in stone masonry, etc., may be readily lifted or raised by first boring a hole thereinto and inserting the implement of this invention into the hole as above mentioned. Similarly, a tension rod or chain may be secured in a wall after first boring or otherwise providing a hole in the wall.

The above broad as well as additional and more specific objects will be clarified in the following description, wherein characters of reference refer to like-numbered parts in the accompanying drawing. It is to be noted that the drawing is intended solely for the purpose of illustration, and that it is therefore neither desired nor intended to limit the invention necessarily to any or all of the exact details of construction shown, except insofar as they may be deemed essential to the invention.

Referring briefly to the drawing, Fig. 1 is a fragmentary perspective view of a beam having the implement of this invention applied thereto so that the beam may be readily lifted without the use of a grapple.

Fig. 2 is a fragmentary perspective view of the implement as it is about to be inserted into a hole in the beam.

Fig. 3 is a sectional view taken on the line 3—3 of Fig. 1.

Fig. 4 is a sectional view taken on the line 4—4 of Fig. 3.

Fig. 5 is a sectional view taken on the line 5—5 of Fig. 2.

Fig. 6 is a side elevational view, per se, of one of the two members constituting the implement.

Referring in detail to the drawing, the numeral 10 indicates, merely by way of example, an unwieldy beam which, when resting on the floor, cannot be readily lifted without first winding a chain or the like around the beam so that the chain may be engaged by a hook.

A hole 11 is made in any suitable manner in the beam 10, of the proper diameter for the purpose of utilizing the implement of this invention. This implement is composed of two parts or members, shown at 12 and 13. The former comprises a U-shaped relatively stoutly built and preferably steel insert possessing a degree of resiliency so that its legs 14 normally assume the position shown in Fig. 6, that is, with the outer edges of the two legs 14 thereof parallel. The diameter of the hole 11 is preferably such that the member 12 may be readily inserted into the hole without forcing the legs 14 together to any substantial extent.

At the junction of the legs 14, or, as it might be termed, at the head of the member 12, shown at 15, the same is widened somewhat as shown in Fig. 4, and an opening 16 is provided through the said head. The legs 14 have a constantly diminishing thickness, or a taper, as is seen in Figs. 4 and 6, from the head 15 to the free ends thereof, so that the space 17 between the inner or opposed surfaces of the legs tapers in an upward direction.

A hook 18 having a shank 19, forms the second member 13 of the implement. Each pair of opposed surface of the shank 19, which is square or rectangular in cross-section, slope toward each other in an upward direction, that is, the opposed surfaces 20 and the opposed surfaces 21, although in the application of the invention illustrated in the drawing, only the surfaces 20 need thus slope.

Normally the implement appears as shown in Fig. 2. In order to provide the lifting or gripping means for the beam 10, the implement as seen in Fig. 2 is inserted into the hole 11 to a depth close to the length of the member 12, and the hook 18 when raised forces the legs 14 apart owing to the wedge-like interaction between the shank and the legs 14, and the legs are thus jammed against the wall of the hole 11. The outer surfaces of the legs 14 are preferably rounded, as shown. It is apparent that, the greater the pull on the hook 18, the tighter is the expanding force applied to the legs 14 and the engagement between the legs and the wall of the hole 11. One leg 14 may be made longer than the other, as shown, for easier insertion into the hole 11.

I claim:

An implement comprising in combination an inverted U shaped member having a pair of legs and a head joining said legs at one end, the outer surfaces of said legs being substantially mutually parallel, said head having an opening therethrough, a hook having a shank passing through said head opening and slidable in said head opening, said shank being substantially square in cross-section and having two opposed surfaces thereof sloping toward each other at a constant acute angle throughout the length of the shank in the direction from the free end of the shank toward said hook, the inner opposed surfaces of said member normally sloping toward each other at a constant acute angle throughout the length of said legs substantially equal to said first-named angle in the direction from the free ends of said legs toward said head, said inner opposed surfaces of said shank being positioned adjacent said inner opposed surfaces of said member, pulling of said hook in a direction tending to extract the shank from said head opening causing said shank to slide in said direction with respect to said member with said opposed surfaces of that portion of said shank between said legs in full surface contact with said opposed surfaces of said member to spread said legs of said member.

LOUIS EASTLUND.

REFERENCES CITED

The following references are of record in the file of this patent:

UNITED STATES PATENTS

| Number | Name | Date |
|---|---|---|
| 1,363,934 | Upton | Dec. 28, 1920 |
| 1,603,591 | Ghetti | Oct. 19, 1926 |

FOREIGN PATENTS

| Number | Country | Date |
|---|---|---|
| 339,507 | Great Britain | Dec. 11, 1930 |